United States Patent [19]  [11] 4,041,359
Mizushima et al.  [45] Aug. 9, 1977

[54] METHOD OF MAKING AN ELECTROLYTIC CAPACITOR AND ELECTROLYTIC CAPACITOR MADE THEREBY

[75] Inventors: Wataru Mizushima; Koreaki Nakata, both of Hirakata; Nobuhiro Hamasaki, Neyagawa; Yoshio Iida, Suita, all of Japan

[73] Assignee: Matsushita Electric Industrial Co., Ltd., Japan

[21] Appl. No.: 586,977

[22] Filed: June 16, 1975

Related U.S. Application Data

[63] Continuation of Ser. No. 419,965, Nov. 29, 1973, abandoned.

[30] Foreign Application Priority Data

Dec. 6, 1972  Japan .................................. 47-122764
Dec. 28, 1972  Japan .................................. 48-3428
Jan. 20, 1973  Japan .................................. 48-8860
Jan. 20, 1973  Japan .................................. 48-8861
Jan. 20, 1973  Japan .................................. 48-8862
Jan. 20, 1973  Japan .................................. 48-8863

[51] Int. Cl.$^2$ ............................................. H01G 9/00
[52] U.S. Cl. ..................................... 361/433; 29/570; 252/506
[58] Field of Search .................... 317/230; 29/570; 252/506

[56] References Cited
U.S. PATENT DOCUMENTS

| 3,296,500 | 1/1967 | Booe | 317/230 |
| 3,343,047 | 9/1967 | Comado et al. | 317/230 |
| 3,599,053 | 8/1971 | Iida et al. | 317/230 |
| 3,641,399 | 2/1972 | Klein et al. | 317/230 |
| 3,708,728 | 1/1973 | Sterling et al. | 317/230 |

FOREIGN PATENT DOCUMENTS 2,218,186  11/1972  Germany .......................... 317/230

Primary Examiner—Michael J. Lynch
Assistant Examiner—Joseph E. Clawson, Jr.
Attorney, Agent, or Firm—Wenderoth, Lind & Ponack

[57] ABSTRACT

A method for making an electrolytic capacitor. A valve metal powder of the sponge type is compressed into a compact body and other usual steps including anodization and electrode application are carried out thereon. Mainly due to the use of sponge type valve metal powder, this method makes it unnecessary to carry out the conventionally employed step of sintering the compact body and produces an electrolytic capacitor having properties better than those obtained by the conventional method. This invention also provides an electrolytic capacitor characterized by the use of sponge type valve metal powder and specific lubricant materials.

12 Claims, 9 Drawing Figures

METHOD OF MAKING AN ELECTROLYTIC CAPACITOR AND ELECTROLYTIC CAPACITOR MADE THEREBY

This application is a continuation of U.S. Pat. application Ser. No. 419,965 filed Nov. 29, 1973, now abandoned.

This invention relates to a method for making an electrolytic capacitor and also to an electrolytic capacitor made thereby.

Conventionally, a solid type electrolytic capacitor having a small volume and having a high CV value has been made as follows. (The CV value is the product of capacitance and voltage.)

A valve metal powder such as tantalum, aluminum, columbium and titanium is compressed into a dense but porous compact body with a conductive wire embedded therein. The conductive wire is a refractory metal. A valve metal powder is a powder of a metal which will have an insulating dielectric film formed thereon by an anodization treatment. The compact body is then sintered. The sintered body is an anode. The effective surface area of the anode consists essentially of the exposed surfaces of the particles of the sintered valve metal powder that are interconnected through the pores of the sintered body. Then, the anode is anodized to form an insulating dielectric film (oxide film) on the surface thereof. The pores are then filled with a conductive material such as manganese oxide, which serves as a solid electrolyte. The thus treated body is then covered with a further conductive material, such as a colloidal carbon paint or a silver paint. The two conductive materials, e.g. the manganese oxide and the carbon silver paint, are electrically connected to each other and serve as a counter electrode in which the carbon is in electrical contact with the manganese oxide. Thus, an electrolytic capacitor is made.

However, this conventional technique has the disadvantage that the sintering step shrinks the volume of the compact body and reduces the porosity and the effective surface area of the compact body, resulting in a decrease of capacitance of the resultant capacitor. Furthermore, to carry out the sintering step, a high vacuum and a high temperature are required. The high vacuum is necessary for preventing oxidization of the body. (An inert gas may be provided in the vacuum.) The high temperature usually required is about 2000° C. Therefore, the conventional electrolytic capacitor and the method for making it are expensive. Moreover, the method is troublesome. Furthermore, since the sintering reduces the volume, etc., as set forth above, inconsistently, the production yield of the conventional technique is very low.

Accordingly, an object of this invention is to provide an inexpensive electrolytic capacitor having a high CV value with a high production yield and without it being necessary to increase the volume of the resultant capacitor.

Another object of this invention is to provide a simple and inexpensive method for making an electrolytic capacitor having a high CV value, as well as low leakage current and/or high mechanical strength with a high production yield without it being necessary to increase the volume of the resultant capacitor.

These objects are achieved according to this invention mainly by using sponge type value metal powder. The method of this invention comprises the steps of providing a sponge type valve metal powder and a conductive wire; compressing said valve metal powder into a compact body having pores and having said conductive wire partially embedded therein, said conductive wire and said valve metal powder acting as an anode; subjecting said compact body with said conductive wire therein to an anodization treatment so as to form a dielectric film covering exposed surfaces of said particles of said valve metal powder and the embedded part of said conductive wire; filling said pores of said compact body and covering an outer surface of said compact body with a conductive material; and applying a further conductive material which is electrically connected to said conductive material. The electrolytic capacitor according to this invention comprises a compact body having a sponge type valve metal powder and a lubricant material compressed together; a conductive wire partially embedded in said compact body and electrically connected to said valve metal powder; a dielectric insulating film formed by anodization on the surface of said valve metal powder and the embedded part of said conductive wire, said valve metal powder, said lubricant material, the embedded part of said conductive wire and said dielectric insulating film defining pores in said compact body; a conductive material filling said pores and covering an outer surface of said compact body; and a further conductive material which is electrically connected to said conductive material.

Details of this invention will be described hereinafter with reference to the accompanying drawings, in which.

In the Figures, the same elements are represented by the same reference numerals.

Figure 1:
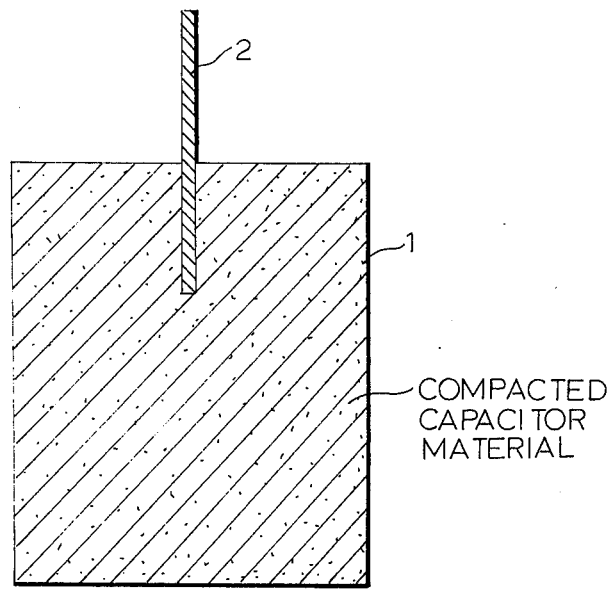
FIG. 1 is a schematic simplified cross-sectional view of an electrolytic capacitor according to this invention.

FIG. 1 shows a very simplified cross-sectional view of an electrolytic capacitor made by the method of this invention. Referring to FIG. 1, reference numerals 1 and 3 designate a compact body and a conductive wire, respectively. The conductive wire 2 is embedded in the compact body.

Figure 2:
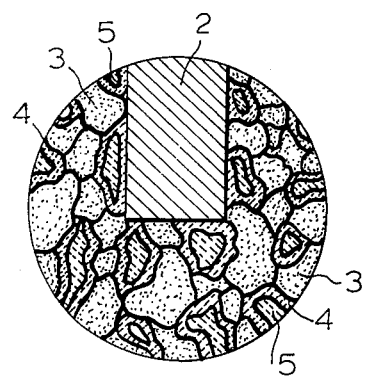
FIG. 2 is a schematic, enlarged and exaggerated scale cross-sectional view of one part of the view of FIG. 1.

FIG. 2 shows a more detailed and microscopical structure of one part of the capacitor of FIG. 1, including the vicinity of the end of the embedded part of the conductive wire 2. Referring to FIG. 2, reference numeral 3 is a particle of a valve metal powder, which particles 3 are electrically connected to each other and to the conductive wire 2. Reference numeral 4 designates an insulating dielectric film formed on the exposed surface of the valve metal powder 3 and the conductive wire 2. Reference numeral 5 designates a conductive material filling the spaces defined by the valve metal powder 3, the insulating dielectric film 4, and the embedded part of the conductive wire 2. Although it seems as if the dielectric insulating film 4 is composed of separate pieces of film and the conductive material 5 also seems to be composed of separate pieces of conductive material, according to FIG. 2, the dielectric insulating film 4 is actually a continuous layer, and the conductive material 5 is also a continuous element which is also electrically continuous. The conductive material 5 is electrically connected to a further conductive material (not shown). The conductive wire 2 and the valve metal powder 3 compose an anode. The conductive material 5 and the further conductive material compose a counter electrode. Thus, the structure of the capacitor can be regarded as an insulating dielectric layer 4 interposed between the anode and the counter electrode.

Figure 3A:
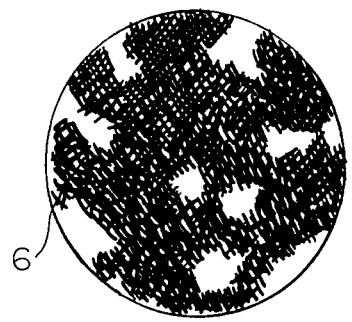
FIG. 3A is a further enlarged view of one part of FIG. 2 (particles of valve metal powder)
Figure 3B:
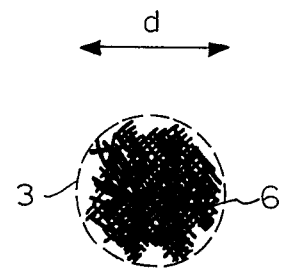
FIG. 3B is an enlarged view of one particle of valve metal powder, which particle is composed of plural particle elements.

FIG. 3A shows a still further microscopic structure. Reference numeral 6 designates a particle element of the particle of valve metal powder 3. One particle of the valve metal powder 3 is composed of a plurality of particle elements 6, as shown in FIG. 3B. The average particle size d of a particle of the valve metal powder of sponge type is about 5 to about 500 microns. The word "sponge type" is used here to designate the structure as shown in FIG. 3B (or 3A). In one particle of sponge type valve metal, there is a plurality of particle elements 6 complicatedly intertwined which serve as a plurality of protrusions from the particle. It is presumed that mainly due to the many protrusions from the particles, the particles of the sponge type valve metal powder are easily interengaged with each other with a high mechanical strength when a pressure is applied thereto. This structure can be called "fastener" bonding of the particles of a sponge type powder because adjacent particles are bonded in a manner like the bonding of a fastener, rather than being welded. With the conventional technique, such fastener bonding cannot be obtained because adjacent particles are partially welded permanently by the sintering. The sizes of the particle elements 6 are not distributed in a wide range, but the size $d$ of particles 3 are distributed widely in a range of, e.g. 5 to 500 microns.

Any suitable and available materials can be used for the conductive wire 2. It is an economical advantage according to this invention that a conductive wire which has a melting point lower than that of a refractory metal can be used because a sintering step is not employed. For example, aluminum and an aluminum alloy can be used therefor. Of course, tantalum can also be used therefor. One example of the aluminum alloy is an alloy comprising aluminum as a major element and an additive of tantalum, silicon, zirconium, titanium, colombium, or molybdenum.

Any available and suitable materials can be used for the sponge type valve metal powder. For example, tantalum, titanium, zirconium and aluminum of the sponge type can be used therefore. One example of making sponge type tantalum is to reduce potassium tantalum fluoride with sodium. According to this patent application, a product made by such reduction treatment is defined as a reduction product of potassium tantalum fluoride with sodium. Usually, such reduction product comprises sponge type particles each having a shape as shown in FIG. 3B (reference numeral 3), and also having a particle size $d$ of 5 to 500 microns. According to this invention, it is preferred to use sponge type particles having various particle sizes $d$ for obtaining, e.g. a higher mechanical strength of the resultant capacitor. The sponge type powder usually has a green density of 2–3 gram/cm$^3$, wherein green density is the density of a powder which is not compressed and loose.

The insulating dielectric film is a film made on the exposed surface of the particles of the valve metal powder 3 and the conductive wire 2 by a well-known anodization treatment (anodic oxidation). When tantalum, titanium and aluminum are used as the valve metal powder, the insulating dielectric films are Ta$_2$O$_5$, TiO$_2$ and Al$_2$O$_3$, respectively.

Any available and suitable materials can be used for the conductive material 5. For example, manganese oxide, lead oxide, and chromium oxide can be used therefor.

In making an electrolytic capacitor according to this invention, the following steps are taken.

A sponge type valve metal powder is prepared. It is compressed with a suitable pressure into a compact body. Usually, a preferable pressure therefor is 500 – 5000 kg/cm$^2$. This is because with a pressure less than 500 kg/cm$^2$, the resultant compact body does not become firm, and with a pressure more than 5000 kg/cm$^2$, the required porosity of the compact body into which, e.g. the conductive material is put, is lost, and the compact body becomes nearly a non-porous body. Before carrying out the compressing step, a conductive wire 2 is put part way into the valve metal powder. Thus, the resultant compact body has sufficient pores and also has the conductive wire partially embedded in the compact body. The thus made compact body is then subjected to an anodization treatment to form an insulating dielectric layer on the exposed surface of the interengaged particles valve metal powder and the embedded part of the conductive wire.

Any available and suitable methods can be used for the anodization. For example, the anodization can be carried out by immersing the compact body in an anodizing bath containing an aqueous solution of H$_3$PO$_4$ and a cathode inert to said solution, and applying a film forming D.C. voltage between the conductive wire and the cathode. In this case, the preferable weight percent of H$_3$PO$_4$ in the aqueous solution is 0.2 to 1.2 and preferable temperature of the anodizing bath is 80° to 95° C. The thickness of the dielectric insulating film (oxide film) on the anode depends on the size of the film forming D.C. voltage as is well-known. Thus, to change the thickness, the applied voltage is changed.

Then, the pores (spaces) in the compact body are filled with a conductive material. Of course, it is very difficult or may be impossible to fill them completely (100%), but it is preferable to fill them as much as possible. Any available and suitable method can be used for the filling step. In the case when the conductive material with which the pores are to be filled in manganese oxide (dioxide), the filling step can be carried out by immersing the compact body in a manganese nitrate solution and subjecting the thus immersed compact body to pyrolysis. The pyrolysis is preferably carried out in a furnace kept at a temperature of 200°–320° C. It has been discovered according to this invention that a higher mechanical strength of the resultant compact body can be obtained the more the pores of the compact body are filled with the conductive material. As the degree of filling increases, the capacitance of the resultant capacitor also increases. A preferable method to fill them more fully with the conductive material is to reform the compact body by applying a D.C. voltage thereto in an acetic acid solution after the step of pyrolysis, and then repeat the steps of filling (immersing and pyrolysis) and reforming a plurality of times. This is because by only repeating the steps of immersing and pyrolysis, the dielectric insulating film is likely to be damaged by the pyrolysis during the filling step. The reforming step can repair possible damage of the dielectric insulating film.

Figure 4:
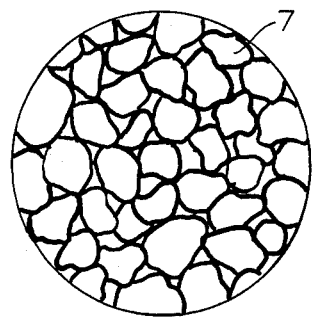
FIG. 4 is an enlarged view of a cross-section of a compact body made by using a valve metal powder of the lump type.

FIG. 4 shows an enlarged view of a cross-section of a compact body made by using a lump type valve metal powder 7. This Figure is shown for comparison with a sponge type valve metal powder. This lump type valve metal powder is usually used in the conventional technique of making electrolytic capacitors. When a lump type valve metal powder is used, a compact body (anode) having a sufficiently high mechanical strength and a sufficiently high porosity cannot be made without using a sintering process. Thus, the sintering process is a requisite process when a lump type valve metal powder is used. This is presumably because each particle of a lump type valve metal powder as shown in FIG. 4 does not have such a complicated surface structure as does a sponge type valve metal powder particle, and mere compression of the lump type valve metal powder does not cause adjacent particles thereto to join together strongly. Without the sintering process, furthermore, the electrical contact of many of the adjacent lump type particles becomes bad, resulting in a high electrical resistance of the anode Thus, the leakage current of the resultant capacitor becomes high, which is undesirable. Accordingly, it has been a basic concept of the conventional technique, which is the starting point of this invention, that a sintering process must be used.

In compressing a valve metal powder into a compact body, usually a press mold is used. However, the compression sometimes causes the surface of the press mold and the surface of the compact body to be partially welded to each other. This leads to the necessity of using many press molds for compression. In order to avoid the welding by compression and the necessity of many press molds, a lubricant material is usually used. The lubricant material is added to and mixed with the valve metal powder before the step of compressing the valve metal powder. This lubricant material acts also as a binder which helps to promote the body formation of the compact body. According to the conventional technique using a sintering process, the materials usable as a lubricant material are very limited. They are required to be able to sublimate during the sintering (at high temperature), and also must be able to get out of the compact body under, e.g. high vacuum. Some thermally instable organic materials, such as camphor, paraffin and higher fatty acids are used therefor. Otherwise, carbonated materials of the lubricant materials remain in the resultant capacitors, which is quite undesirable.

On the other hand, according to this invention, lubricant materials are selected for reasons completely different from those of the conventional technique, because a sintering step is not used according to this invention. According to this invention, inorganic materials can be used which are electrically insulating, insoluble in water, and stable at a temperature of, e.g. 300° C., and which are harmless to the resultant capacitors, even if they remain therein. For example, $Al_2O_3$, $SiO_2$, $MgF_2$, $CaF_2$, $MoS_2$, $BaSO_4$, glass, and quartz can be used therefor. According to this invention, organic materials can also be used which are electrically insulating, insoluble in water, and stable at a temperature of, e.g. 300° C., and which are harmless to the resultant capacitors, even if they remain therein. For example, organic fluoro compounds, such as fluoro-ethylene polymers (e.g., tetra-fluoro-ethylene polymer and tri-fluoro-chloro-ethylene-polymer) can be used therefor. Such organic lubricant materials cannot be used in the conventional method, because they are carbonated by the sintering step and remain in the resultant capacitors as carbon. The inorganic and organic lubricant materials according to this invention remain in the internal interstices of the compact bodies, but are harmless. The preferred amount of such inorganic and organic lubricant materials included in the valve metal powder is 0.1 to 5% by weight. The lower limit is determined by the possiblity of avoiding the above-described welding, and the upper limit is determined by the variation of mechanical strength of resultant capacitors with the variation of the amount of lubricant material and by cost.

In comparison with the conventional lubricant materials, camphor, which is an example of the lubricants used in the conventional techniques cannot be used according to this invention, because if it is used in this invention, it remains in the resultant capacitors and makes the properties thereof instable.

According to this invention, materials which are readily soluble in water, such as boric acid, mannit, sugar, sugar-alcohol, urea, and $(NH_4)_2SO_4$ can be also used as a lubricant material, although in such case it becomes necessary to employ a further step of washing the compact body with water after the step of compression to remove the lubricant material.

This invention will be described with reference to preferred embodiments thereof as follows.

EXAMPLE 1

Figure 5:
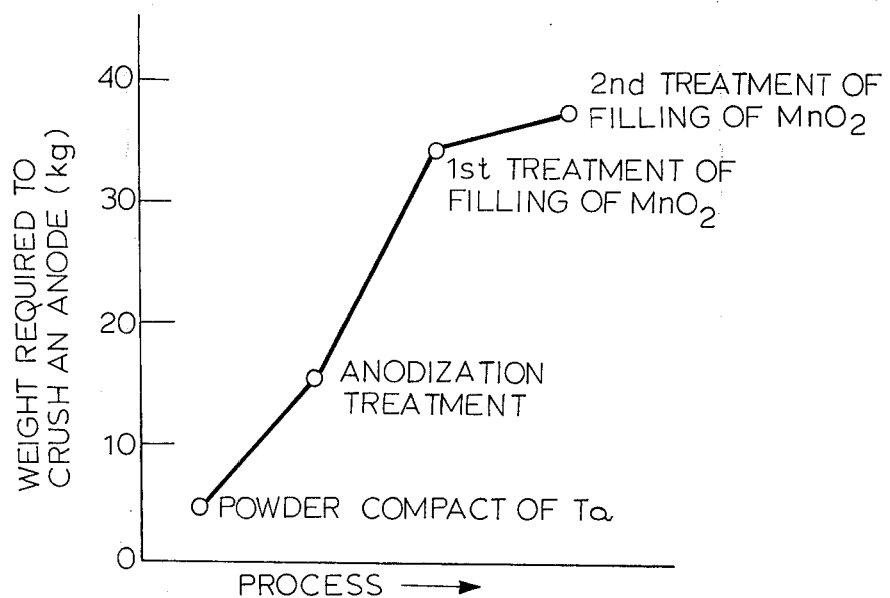
FIG. 5 is a graph illustrating the mechanical strengths of a capacitor at various points in a manufacturing process.

A powder of sponge type tantalum, produced by reduction of potassium tantalum fluoride with sodium, having particles sizes d ranging from 5 to 500 microns was prepared. Fifteen different kinds of sample powders were made by using the thus prepared powder or tantalum. One of them (Sample No. 1) was just the thus prepared powder per se, i.e. not including any lubricant material. The other (Samples Nos. 2-15) had lubricant materials included therein, as listed in Table 1. 100 mg of each sample powder was molded around a tantalum wire by compressing, at a pressure of 1000 kg/cm², to form a compact body of cylindrical shape having a diameter of 2.3 mm and length of 3.2 mm, wherein the tantalum wire was partially embedded in the center of the cylinder. Three of the thus made compact bodies (Samples Nos. 13-15) were then washed with running water to remove the lubricant material included therein and were then dried. Then, anodization treatment was carried out, as follows. Each of the 15 compact bodies (Samples Nos. 1-15) was immersed in an anodizing bath containing an aqueous solution having 1.0 wt. % of $H_3PO_4$ and a cathode inert to the aqueous solution. A film forming D.C. voltage was applied between the tantalum wire of each sample and the cathode with the aqueous solution kept at a temperature of 90° C. A dielectric film was made thereby which covered the exposed surfaces of the powder particles of tantalum and the embedded portion of the tantalum wire. The samples thus subjected to the anodization treatment were washed with water and dried. Then, the samples were immersed in a manganese nitrate solution, and then subjected to pyrolysis in a furnace at a temperature of 250° C. A conductive layer of manganese dioxide was thus produced on the dielectric film and the surface of each sample. Each of the thus treated samples was soaked in a 1 wt. % acetic acid solution and reformed by applying a D.C. voltage thereto. A series of these processes (soaking, reforming, immersing in manganese nitrate solution, and pyrolysis) was repeated eight times. Thereafter, a graphite coating (colloidal carbon) was applied on the manganese dioxide layer. On the graphite coating, silver paint was applied. The graphite coating and the silver paint were baked on each sample to get to a counter electrode. Finally, a cathode lead was soldered onto each sample. Thus, Samples Nos. 1-15 were completed. It has been discovered according to this invention that the porous anode formed by pressing a sponge type tantalum powder can be strengthened by the anodization treatment (dielectric film), and further strengthened by the step of filling the pores thereof with manganese oxide. This is apparent from FIG. 5. FIG. 5 is a graph illustrating the mechanical strength (weight required to crush an anode) of anodes (compact bodies) measured at various steps with respect to samples made in the above-described manner. The tan δ of the compact bodies was also further improved by repeating the step of filling with manganese oxide more times. Table 1 shows various measured properties of Samples Nos. 1-15. As shown in Table 1, the anode produced by the methods of this invention has high porosity, and the dielectric film formed thereon exhibits a high CV value. For comparison, a sample was made in the conventional manner employing a sintering step (1800° C.). This sample had a porosity of 37%, a CV value of 6000 $\mu$F.V/g, and a leakage current of 0.002 $\mu$A/$\mu$F.V.

Figure 6:
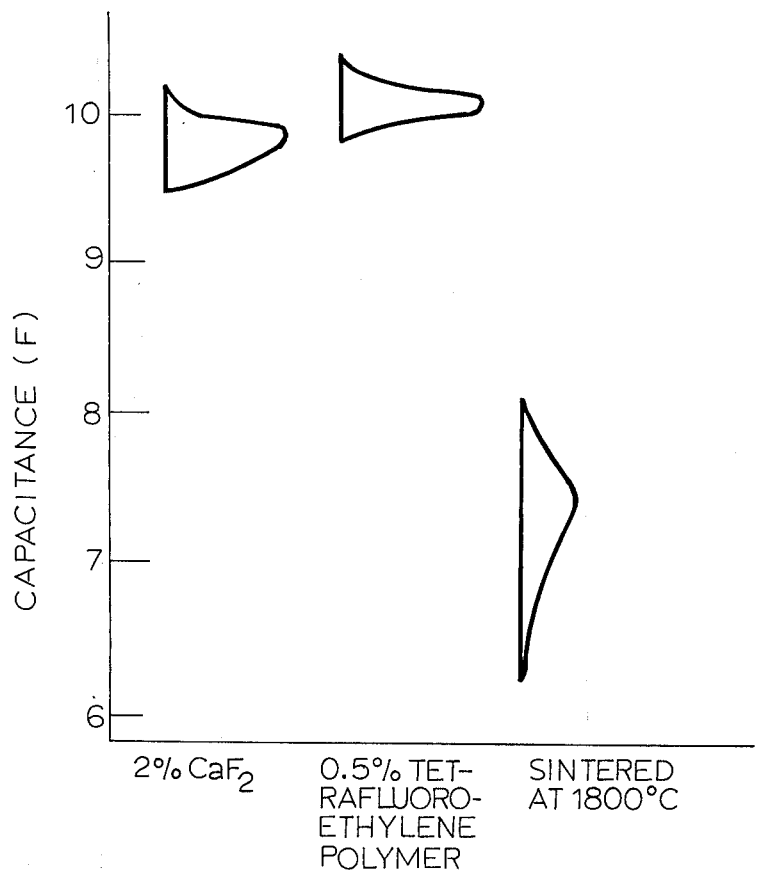
FIG. 6 is a relative distribution chart of capacitance of various capacitors made under various conditions.
Figure 7:
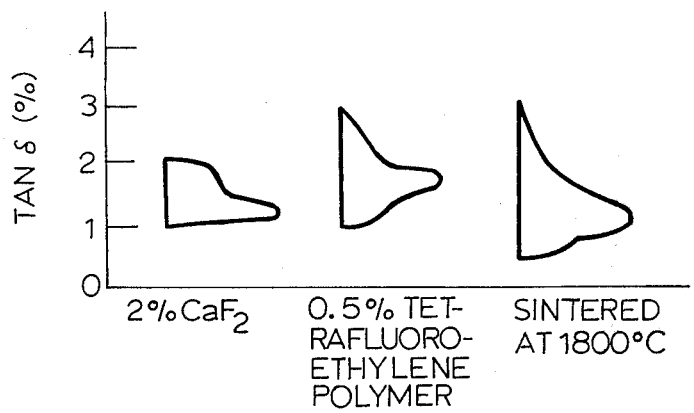
FIGS. 7 and 8 are relative distribution charts of tan δ and leakage current of the capacitors subjected to the measurements for FIG. 6.
Figure 8:
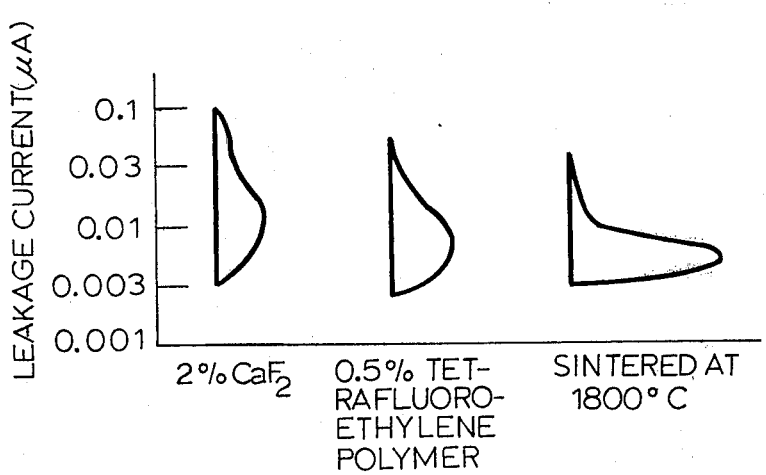

Many samples corresponding to Samples Nos. 5 and 9 and the conventional method were made in the manners as described above. FIGS. 6, 7 and 8 show relative distribution charts of capacitance, tan δ and leakage current, respectively, of the samples (capacitors) thus made. The same amounts of tantalum were used for making these samples in order to compare the characteristics thereof. As is apparent from FIGS. 6, 7 and 8, the properties of tan δ and the leakage current for the capacitors according to this invention are comparable with those made by the conventional techniques, but this invention contributes to remarkably higher values of capacitance than those made according to the conventional technique.

EXAMPLE 2

Three different kinds of samples (Samples Nos. 16–18) were prepared in a manner the same as that of Example 1, except that in this Example 2, aluminum, an aluminum-silicon alloy, and an aluminum-titanium alloy were used as a conductive wire, and 1 wt. % of $NH_4H_2PO_4$ was used as an aqueous solution for the anodization treatment. The lubricant material used here was tetra-fluoro-ethylene polymer. Table 2 shows the measured properties of the thus made Samples Nos. 16–18. Table 2 indicates that satisfactory properties of anodes can be obtained by using economical materials for the conductive wire.

While preferred embodiments of this invention have been shown and described in the Examples 1 and 2, it is apparent that changes and modifications may be made therein without departing from the invention in its broader aspects. The aim of the appended claims, therefore, is to cover all such changes and modifications as fall within the spirit and scope of this invention.

TABLE 1

| SAMPLE No. | LUBRICANT MATERIAL | CONTENT (Wt. %) | CHARACTERISTIC OF ANODIZED ANODE | | |
|---|---|---|---|---|---|
| | | | POROSITY (%) | CV ($\mu$F.V/g) | Leakage Current ($\mu$A/$\mu$F.V) |
| 1 | No Lubricant | 0 | 65 | 9300 | 0.0002 |
| 2 | $Al_2O_3$ | 2.0 | 54 | 8900 | 0.00005 |
| 3 | $SiO_2$ | 2.0 | 52 | 9200 | 0.00007 |
| 4 | $MgF_2$ | 2.0 | 58 | 9000 | 0.00007 |
| 5 | $CaF_2$ | 2.0 | 57 | 11000 | 0.00007 |
| 6 | $MoS_2$ | 2.0 | 48 | 9100 | 0.00008 |
| 7 | Glass Powder | 2.0 | 46 | 8900 | 0.0003 |
| 8 | Quartz Powder | 1.0 | 42 | 9000 | 0.0002 |
| 9 | Tetra-Fluoro Ethylene Polymer | 0.2 | 52 | 9200 | 0.00008 |
| 10 | | 0.5 | 56 | 9100 | 0.00008 |
| 11 | | 2.0 | 64 | 9500 | 0.0001 |
| 12 | Tri-Fluoro Chloro Ethylene Polymer | 2.0 | 62 | 9300 | 0.0001 |
| 13 | Mannit | 1.0 | 56 | 9200 | 0.0003 |
| 14 | Urea | 2.0 | 47 | 9400 | 0.0004 |
| 15 | Boric Acid | 1.0 | 52 | 8500 | 0.0005 |

TABLE 2

| SAMPLE NO. | LEAD WIRE | CHARACTERISTICS OF ANODIZED ANODE | | |
|---|---|---|---|---|
| | | POROSITY (%) | CV($\mu$F.V/g) | LEAKAGE CURRENT ($\mu$A/$\mu$F.V) |
| 16 | Al | 52 | 9200 | 0.0005 |
| 17 | Al-Si | 52 | 9200 | 0.0001 |
| 18 | Al-Ti | 52 | 9200 | 0.0007 |

What is claimed is:

1. An electrolytic capacitor comprising a compact unsintered body as an anode structure, said body having particles of a tantalum metal powder, each particle being composed of plural intertwined particle elements which serve as plural protruding parts protruding from the particle, and an electrically insulating lubricant-binder material selected from the group consisting of $Al_2O_3$, $SiO_2$, $MgF_2$, $CaF_2$, $MoS_2$, $BaSO_4$, glass, quartz and fluoro ethylene polymer, said metal powder and lubricant-binder material being compressed together to an extent sufficient to bind said particles securely to each other; a conductive wire partially embedded in said compact body and in electrical contact with some of the particles of said valve metal powder; a dielectric insulating film on the surface of the particles of said valve metal powder and the embedded part of said conductive wire, said body having interstices therein among the bound together particles, the lubricant-binder material, the embedded part of said conductive wire and said dielectric insulating film; a conductive material substantially filling said interstices and covering the outer surface of said compact body; and a further conductive material on said compact body which is in electrical contact with said conductive material.

2. An electrolytic capacitor according to claim 1 wherein said valve metal powder of tantalum is a reduction product of potassium tantalum fluoride with sodium.

3. An electrolytic capacitor according to claim 1 wherein the particles of said valve metal powder have a particle size of 5 to 500 microns.

4. An electrolytic capacitor according to claim 1 wherein said conductive wire consists of a metal selected from the group consisting of tantalum, aluminum and an aluminum alloy.

5. An electolytic capacitor according to claim 4 wherein said aluminum alloy comprises aluminum as a major element and one member as an additive selected from the group consisting of tantalum, silicon, zirconium, titanium, colombium and molybdenum.

6. An electrolytic capacitor according to claim 1 wherein said conductive material is one member selected from the group consisting of manganese oxide, lead oxide and chromium oxide.

7. An electrolytic capacitor according to claim 6 wherein said conductive material is manganese oxide.

8. An electrolytic capacitor according to claim 1 wherein said further conductive material comprises graphite.

9. An electrolytic capacitor according to claim 8 wherein said graphite is colloidal carbon.

10. An electrolytic capacitor according to claim 8 wherein said further conductive material further comprises silver paint on said graphite.

11. An electrolytic capacitor according to claim 1 wherein said fluoro ethylene polymers comprise tetra-fluoro-ethylene-polymer and tri-fluoro-chloro-ethylene-polymer.

12. An electrolytic capacitor according to claim 1 wherein the amount of said lubricant material added to said valve metal powder is 0.1 to 5% by weight.

* * * * *